US012168237B2

(12) United States Patent
Smolko Schwarzmayr et al.

(10) Patent No.: US 12,168,237 B2
(45) Date of Patent: Dec. 17, 2024

(54) COLLECTOR COMPOSITION CONTAINING BIODEGRADABLE COMPOUND AND PROCESS FOR TREATING SILICEOUS ORES

(71) Applicant: NOURYON CHEMICALS INTERNATIONAL B.V., Arnhem (NL)

(72) Inventors: Natalija Smolko Schwarzmayr, Hjälteby (SE); Charlotte Ewa Karin Gustafsson, Frölunda (SE); Jan Olof Gustafsson, Kungälv (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 929 days.

(21) Appl. No.: 17/250,264

(22) PCT Filed: Jul. 1, 2019

(86) PCT No.: PCT/EP2019/067538

§ 371 (c)(1),
(2) Date: Dec. 22, 2020

(87) PCT Pub. No.: WO2020/007773

PCT Pub. Date: Jan. 9, 2020

(65) Prior Publication Data

US 2021/0121894 A1 Apr. 29, 2021

(30) Foreign Application Priority Data

Jul. 3, 2018 (EP) .................................... 18181479

(51) Int. Cl.
*B03D 1/01* (2006.01)
*B03D 1/004* (2006.01)

(52) U.S. Cl.
CPC ............. *B03D 1/0043* (2013.01); *B03D 1/01* (2013.01); *B03D 1/011* (2013.01); *B03D 2201/02* (2013.01); *B03D 2203/04* (2013.01); *B03D 2203/06* (2013.01)

(58) Field of Classification Search
CPC ........ B03D 1/0043; B03D 1/01; B03D 1/011; B03D 2201/02; B03D 2203/04; B03D 2203/06
See application file for complete search history.

(56) References Cited

U.S. PATENT DOCUMENTS

| | | | | |
|---|---|---|---|---|
| 2009/0114573 A1* | 5/2009 | Pedain | B03D 1/01 | 209/163 |
| 2012/0139985 A1* | 6/2012 | Powers | B41J 2/1752 | 347/16 |
| 2014/0048455 A1* | 2/2014 | Bittner | B03D 1/01 | 564/493 |

FOREIGN PATENT DOCUMENTS

| | | | | |
|---|---|---|---|---|
| EP | 1949963 A1 * | 7/2008 | B03D 1/01 |
| WO | 2012139985 A1 | 10/2012 | |
| WO | WO-2012139985 A2 * | 10/2012 | B03D 1/01 |
| WO | WO-2015091308 A1 * | 6/2015 | B03D 1/011 |
| WO | 2018007418 A1 | 1/2018 | |
| WO | WO-2018007418 A2 * | 1/2018 | B03D 1/0043 |
| WO | WO-2018007419 A1 * | 1/2018 | B03D 1/0043 |

OTHER PUBLICATIONS

EPO, European Extended Search Report issued in EP Application No. 18181479.9, dated Jan. 10, 2019.
EPO, International Search Report issued in IA No. PCT/EP2019/067538, dated Oct. 23, 2019.
Hrabálek, A., et al. "Esters of 6-aminohexanoic acid as skin permeation enhancers: The effect of branching in the alkanol moiety", Journal of Pharmaceutical Sciences, Jul. 7, 2005, pp. 1494-1499, vol. 94, No. 7.

* cited by examiner

*Primary Examiner* — Peter Keyworth
(74) *Attorney, Agent, or Firm* — LORENZ & KOPF, LLP

(57) ABSTRACT

The present disclosure relates to a collector composition containing (i) as a primary collector the compound of the formula (I) wherein R is an alkyl group containing between about 5 and about 16 carbon atoms that may be branched or linear, k is a value of about 1 to 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid, and (ii) a second compound selected from the group of other primary collectors, secondary collectors, depressants, frothers, and solvents. The disclosure also relates to a process to treat siliceous ore that contains a step of froth flotating in the presence of a collector composition that contains the primary collector compound.

20 Claims, No Drawings

COLLECTOR COMPOSITION CONTAINING BIODEGRADABLE COMPOUND AND PROCESS FOR TREATING SILICEOUS ORES

CROSS-REFERENCE TO RELATED APPLICATION

This application is a U.S. National-Stage entry under 35 U.S.C. § 371 based on International Application No. PCT/EP2019/067538, filed Jul. 1, 2019, which was published under PCT Article 21(2) and which claims priority to European Application No. 18181479.9, filed Jul. 3, 2018, which are all hereby incorporated in their entirety by reference.

TECHNICAL FIELD

The present disclosure relates to collector compositions containing biodegradable compounds, and their use in treating siliceous ores.

BACKGROUND

Compounds for use in collector compositions to treat siliceous ores are known from several documents such as WO2012/139985, WO2018/007418. These documents disclose the direct flotation of silicas from iron ores using as the collector composition a composition that contains an alkylethermonoamine.

EP 1949963 discloses a collector composition for siliceous ores which is said to have improved biodegradability. The primary collector in this document is a polyester polyquaternary compound which corresponds to the polyester polyquaternary (PEPQ) compounds as disclosed in WO 2015/091308 together with a process to manufacture these polyester polyquaternary compounds and their use to treat phosphate ores so to recover phosphates therefrom by a reverse flotation to remove silica.

There is however a desire for additional biodegradable collector compositions that have a good performance in direct flotation of silica from siliceous ores different than the state of the art collector compositions.

BRIEF SUMMARY

This disclosure provides a collector composition comprising (i) as a primary collector the compound of the formula (I)

(I)

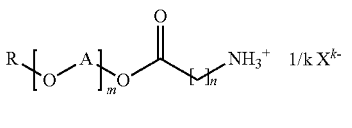

wherein R is an alkyl group comprising between about 5 and about 16 carbon atoms that may be branched or linear, k is a value of about 1 to about 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid; and (ii) a second compound chosen from other primary collectors, secondary collectors, depressants, frothers, and solvents, wherein the other primary collector is chosen from quaternary ammonium cationic surfactants different from the above formula (I), amine-functional surfactants;

wherein the secondary collector is chosen from nonionic and anionic surfactants, wherein the nonionic surfactants are chosen from unbranched and branched fatty alcohols, alkoxylated fatty alcohols, alkylamide ethoxylates, alkyl diethanol amide ethoxylates, wherein the anionic surfactants are chosen from fatty acids, sulphonated fatty acid, acylamidocarboxylates, acylestercarboxylates, alkylphosphates, alkylpyrophosphates, alkylsulphates, alkylsulphonates;

wherein the depressant is chosen from polysaccharides and derivatives thereof, and polyacrylamide polymers;

wherein the frother is chosen from MIBC and propoxylated and ethoxylated C10 alcohols, and wherein the solvent is chosen from C1-C5 alcohols optionally ethoxylated and/or propoxylated, provided that the second compound is not a compound of the formula ROH or R—(O-A)m-OH wherein R and m are the same as in the compound of formula (I).

This disclosure also provides a pulp comprising a crushed or ground siliceous ore and a collector composition that comprises a primary collector compound of the formula (I)

(I)

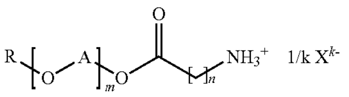

wherein R is an alkyl group comprising between about 5 and about 16 carbon atoms that may be branched or linear, k is a value of about 1 to about 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid.

This disclosure further provides a process to treat siliceous ores wherein the process comprises a step of froth flotating in the presence of a collector composition that comprises a primary collector compound of the formula (I)

(I)

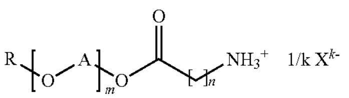

wherein R is an alkyl group comprising between about 5 and about 16 carbon atoms that may be branched or linear, k is a value of about 1 to about 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The present disclosure now provides collector compositions that contain as a primary collector the compound of the formula (I)

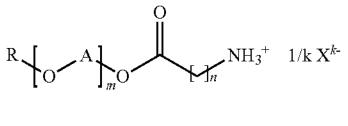

wherein R is an alkyl group containing between about 5 and about 16 carbon atoms that may be branched or linear, k is a value of about 1 to about 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid and (ii) a second compound selected from the group of other primary collectors, secondary collectors, depressants, frothers, solvent, wherein the other primary collector is selected from the group of cationic ammonium-functional surfactants different from the above formula (I), and amine-functional surfactants such as alkylamines, alkylamidoamines and etheramines; the secondary collector is chosen from the group of nonionic, and anionic surfactants, wherein the nonionic surfactants are chosen from the group of unbranched and branched fatty alcohols, alkoxylated fatty alcohols, alkylamide ethoxylates, alkyl diethanol amide ethoxylates, the anionic surfactants are chosen from the group of fatty acids, sulphonated fatty acid, acylamidocarboxylates, acylestercarboxylates, alkylphosphates, alkylpyrophosphates, alkylsulphates, and alkylsulphonates; the depressant is chosen from the group of polysaccharides and derivatives thereof, and polyacrylamide polymers; the frother is selected from MIBC and propoxylated and ethoxylated C6-C10 alcohols, and; wherein the solvent is chosen from the group of C1-C5 alcohols that may be optionally ethoxylated and/or propoxylated, such as preferably propylene glycol, triethylene glycol, ethylene glycol, 2-methoxyethanol, glycerol, or isopropanol, and acetic acid, provided that the second compound is not a compound of the formula ROH or R—(O-A)m-OH wherein R and m are the same as in the compound of formula (I).

It should be noted that some compounds of the above formula I are disclosed for use in pharmaceutical preparations such as in "Esters of 6-aminohexanoic acid as skin permeation enhancers: The effect of branching in the alkanol moiety", A Habralek et al, Journal of Pharmaceutical Sciences, Vol. 94, 1494-1499, (2005).

The disclosure furthermore provides a process to treat siliceous ores wherein the process contains a step of froth flotating in the presence of the primary collector compound of formula (I), preferably froth flotating in the presence of a collector composition containing the primary collector compound (I), and a second compound selected from the group of further primary collectors, secondary collectors, depressants, frothers and solvents, more preferably froth flotating in the presence of the above collector composition. After completion of the flotation, a silicate-enriched flotate is obtained.

The compounds of formula (I) were determined to be readily biodegradable, which adds to the environmental profile of the collector compositions in which they are used. Furthermore, the flotation results resulting when using them in flotating silicas from ores are very good, the compositions deliver better selectivity than known collector compositions containing biodegradable compounds and similarly good or better selectivity than not readily biodegradable alternatives. At the same time the collector compositions and process of the present disclosure provide for outstanding frothing properties. The compounds of formula (I) and collector compositions of the present disclosure were found to be especially suited for ores that are relatively fine, such as siliceous iron ores. The environmentally friendly PEPQ compounds from the prior art, though showing good performance on some ore types, such as phosphate and calcite ores, are not showing superior performance on all non-sulphidic ores. The compounds of the present disclosure appear to be more versatile than PEPQ as they work for several non-sulphidic ore types, e.g. also for iron ore.

Siliceous ores are ores in which silica is present in an amount of at least about 1 wt %. Preferably, silica is present in those ores in an amount of between about 2 and about 50 wt %.

In a preferred embodiment R is an alkyl group that contains about 6 to about 16 carbon atoms. In a more preferred embodiment R is an alkyl group that contains about 8 to about 13 carbon atoms.

In another preferred embodiment R is branched on the carbon atom beta from the oxygen atom. In further embodiments R can contain more than a single branched carbon atom.

It is furthermore preferred when n is 4, 5 or 6.

X is in a preferred embodiment a halogenide, sulphate, phosphate, hydrogen sulphate, hydrogen phosphate, or dihydrogen phosphate anion.

If a further primary collector is present in the collector compositions or processes of the disclosure the further primary collector is selected from the group of amine-functional surfactants and (quaternary) ammonium compounds with a structure different from the above formula (I). Preferably, the further primary collector is selected from the group of fatty amines (alkylamines where the alkyl group is a C11-C24 alkyl), etheramines, etherdiamines, alkylamidoamines, optionally in their (quaternized) cationic form.

If a secondary collector is present in the collector compositions or processes of the present disclosure, the secondary collector is chosen from the group of nonionic and anionic surfactants. If the secondary collector is a nonionic surfactant it can be selected from the group of unbranched or branched fatty alcohols, alkoxylated alcohols, alkylamide ethoxylates, alkyl diethanol amide ethoxylates, alkyl amine ethoxylates. If the secondary collector is an anionic surfactant it can be selected from the group of fatty acids, sulphonated fatty acid, acylamidocarboxylates, acylestercarboxylates, alkylphosphates, alkylpyrophosphates, alkylsulphates, alkylsulphonates.

The secondary collector is preferably selected from the group of nonionics, like unbranched and branched fatty alcohols, alkoxylated fatty alcohols, alkylamide ethoxylates, and alkyl diethanol amide ethoxylates, even more preferably C11-C24 fatty alcohols, or alkoxylated C11-C24 fatty alcohols. Examples of secondary collectors in a most preferred embodiment are branched C11-C17 fatty alcohols, such as iso C13 fatty alcohols, and their ethoxylates and/or propoxylates. The secondary collector is not a compound of the formula ROH or R—(O-A)m-OH wherein R and m is the same as in the compound of formula (I) in the same composition.

In another preferred embodiment the above nonionic secondary collectors are combined with an anionic surfactant.

If a depressant is present in the collector compositions or processes of the present disclosure, such depressant may be chosen from the group of polysaccharides and derivatives thereof, e.g. dextrin, starch, such as maize starch activated by treatment with alkali, and polyacrylamide polymers. Other examples of (hydrophilic) polysaccharides and derivatives thereof are cellulose esters, such as carboxymethylcellulose and sulphomethylcellulose; cellulose ethers, such as methyl cellulose, hydroxyethylcellulose and ethyl hydroxyethylcellulose; hydrophilic gums, such as gum arabic, gum karaya, gum tragacanth and gum ghatti, alginates; and starch derivatives, such as carboxymethyl starch and phosphate starch. The depressant is normally added in an amount of about 10 to about 1,000 g per ton of ore.

If a frother is present in the collector compositions or processes of the present disclosure, examples of suitable froth regulators are methylisobutyl carbinol (MIBC) and alcohols having about 6-10 carbon atoms which are alkoxylated with ethylene oxide and/or propylene oxide, especially branched and unbranched octanols and hexanols. The frother is not a compound of the formula ROH or R—(O-A)m-OH wherein R and m is the same as in the compound of formula (I) in the same composition.

The weight ratio between the primary collector(s) and the secondary collector is typically from about 15:85, more typically about 20:80, most typically about 25:75 to 99:1, typically about 98:2, most typically about 97:3. All weight ratios herein refer to the ratio of active materials, unless stated otherwise.

If a solvent is present in the collector compositions or processes of the present disclosure, such solvent may be chosen from the group of C1-C5 alcohols, including alcohols that contain more than one hydroxyl unit, that optionally may be alkoxylated (ethoxylated and/or propoxylated) and acetic acid. Preferred examples are propylene glycol, ethylene glycol, triethylene glycol, glycerol, isopropanol, 2-methoxyethanol, acetic acid and combinations thereof. The solvent is not a compound of the formulae ROH or R—(O-A)m-OH wherein R and m is the same as in the compound of formula (I) in the same composition. When using the collector compositions of the present disclosure in the flotation of silica ores, it is possible to dilute them by adding further solvents, such as one of the above solvents, or water.

The flotation process of the disclosure is preferably a direct flotation process of silicas, which may correspond with a reversed flotation process of other valuable minerals present in the ore such as iron. In the process of the present disclosure the ore is preferably a siliceous iron ore, hematite ore, magnetite ore, phosphate ore, calcite ore, or potash ore.

Reversed flotation means that the desired ore is not concentrated in the froth, but in the residue of the flotation process. The process of the disclosure is preferably a reversed flotation process for iron, such as magnetite, ores, more preferably for ores that contain more than about 50 wt % of Fe3O4 on total iron oxide content, even more typically more than about 70 wt %, most typically about 80 to about 99 wt %. In another preferred embodiment the ores contain less than about 15 wt % of silica, even more preferably less than about 12 wt %, most preferably less than about 10 wt %, on total solids weight in the ore. In a reversed flotation process for concentrating iron, such as magnetite, ores, the pH during flotation in a preferred embodiment is suitably in the range of about 5-10, preferably in the range of about 7 to about 9. In yet another preferred embodiment the ores treated by the process of the present disclosure have an average particle size of less than about 200 μm.

The collector composition of the present disclosure is very beneficially used in a reversed froth flotation process of iron ores to enrich iron.

The froth flotation process of the disclosure in an embodiment comprises the steps of

- mixing a ground siliceous ore with an aqueous medium, preferably water;
- optionally, especially if the ore is an iron ore, concentrating the medium with magnetic separation;
- optionally, conditioning the mixture with a depressant;
- optionally, adjusting the pH;
- conditioning the mixture with a primary collector of the formula (I) or a collector composition as defined herein;
- introducing air into the conditioned water-ore mixture; and
- skimming off the froth formed.

The composition is preferably liquid at ambient temperature, i.e., at least in the range of about 4 to about 25° C.

The process of the disclosure may involve other additives and auxiliary materials that can be typically present in a froth flotation process, which additives and auxiliary materials can be added at the same time or (partially) separately during the process. Further additives that may be present in the flotation process are (iron) depressants, frothers/froth regulators/froth modifiers/defoamers, cationic surfactants (such as alkylamines, quaternized amines, alkoxylates), and pH-regulators. After conditioning of the ore, the primary collector of the formula (I) or the collector compositions as defined herein can be added, optionally partially neutralized, and the mixture is further conditioned for a while before the froth flotation is carried out. After completion of the flotation, a silicate-enriched flotate and a bottom fraction poor in silicate can be withdrawn.

In another aspect, the present disclosure relates to a pulp comprising crushed and ground siliceous ore, preferably siliceous iron ore, and the primary collector compound of formula (I) or the collector composition as defined herein, and optionally further flotation aids. These flotation aids may be the same as the above other additives and auxiliary materials, which can be typically present in a froth flotation process.

The amount of the collector used in the process of reversed flotation of the present disclosure will depend on the amount of impurities present in the ore and on the desired separation effect, but in some embodiments will be in the range of from about 1-500 g/ton dry ore, preferably in the range of from about 10-200 g/ton dry ore, more typically about 20-150 g/ton dry ore.

EXAMPLES

Example 1

Ore in flotation tests:

Fe-69.5%, $SiO_2$-1.3%.

Flotation Chemicals

Isodecyloxypropylamine (partly neutralized by acetic acid) (Lilaflot 811 M)

Polyester polyquaternary ammonium compound synthesized as described in WO 2015/091308A1 Example 1.

Alkyl-6-aminohexanoate sulphates from Exxal™ 8, Exxal™ 10 and 2-ethylhexanol were synthesized as described in "Esters of 6-aminohexanoic acid as skin permeation enhancers: The effect of branching in the alkanol moiety", A Habralek et al, Journal of Pharmaceutical Sciences, Vol. 94, 1494-1499, (2005).

Synthetic Process Water

Synthetic process water was used in the flotation tests. It was prepared by adding appropriate amounts of commercial salts to deionised water. Following the composition described by chemical analysis of process water from plant, table 1.

TABLE 1

Composition of flotation process water used in in the lab tests

| pH | Ca, mg/l | Mg, mg/l | $SO_4$, mg/l | Cl, mg/l | $HCO_3$, mg/l |
|---|---|---|---|---|---|
| Approx . . . 8 | 170 | 20 | 440 | 170 | 57 |

Flotation Procedure

The study has been done as stepwise rougher flotation with a Denver laboratory flotation machine. The machine is modified and equipped with an automatic froth scraping device and a double lip cell. Apparatus parameters see Table 2.

The ore sample is added to the flotation cell and the cell is filled up with synthetic process water (40% solids). Water temperature 19-22° C. is used as standard. The rotor speed is constant during the test, 900 rpm.

1. The pulp was conditioned for 2 minutes with Dextrin (Crystal Tex 627 M) as depressant (300 g/t).
2. The collector solution (1 wt %) was added and conditioned for 2 minutes.
3. Air and automatic froth skimmer were switched on at the same time.
4. The flotation continued for 3 minutes. Water was added continuously by a tube below the pulp surface to keep the right pulp level.
5. The flotation was repeated twice (or three times) from (2) with the only difference being a conditioning time of 1 minute instead of 2.

The froth products and the remaining cell product were dried, weighed and analyzed for content of silicate minerals, defined as insoluble in 25% hydrochloric acid.

The content of acid insoluble remaining in the cell product was then calculated after the first, second and third flotation steps.

TABLE 2

Flotation machine parameters

| Denver flotation machine | |
|---|---|
| Cell volume (l) | 1.3 |
| Solids in pulp (%) | 40 |
| Rotor speed (rpm) | 900 |
| Airflow (l/min) | 2.5 |
| Scrape frequency ($min^{-1}$) | 15 |

Frothing Procedure

- conditioning of the depressant, same Dextrin as is used in the flotation, and mineral slurry in the process water for 2 minutes at 900 rpm;
- addition of the collector and conditioning for an additional 2 minutes at 900 rpm;
- aeration at a constant rate of 2.5 L/min;
- the froth formation is monitored for 2 minutes and recorded every 20 seconds, or until the froth height no longer increases, however the minimum time is set to 2 minutes;
- the aeration is stopped and the froth collapse is recorded every 20 seconds until all froth has collapsed.

The results are summarized below in Tables 3 and 4.

TABLE 3

Flotation results presented as acid insoluble vs iron weight recovery for several collectors in same iron ore

| Collector | Total dosage, g/t | Acid insoluble remaining in the cell, % | Acid insoluble distributed to the froth, % | Iron recovery, % | Maximum height of the froth, cm* |
|---|---|---|---|---|---|
| Isodecyloxypropylamine | 20 | 1.5 | 24.40 | 95.80 | |
| (partly neutralized by | 30 | 1.36 | 34.14 | 92.36 | |
| acetic acid) (comparison) | 40 | 1.27 | 40.44 | 89.27 | 32 |
| Polyester polyquaternary | 100 | 1.96 | 1.71 | 99.25 | |
| ammonium compound | 200 | 1.92 | 5.23 | 97.86 | |
| (comparison) | 300 | 1.85 | 11.23 | 95.18 | NA |
| Isodecyl (highly branched | 50 | 1.47 | 25.93 | 94.42 | |
| (Exxal ™ 10 type))-6- | 75 | 1.28 | 39.16 | 88.98 | 22 |
| aminohexanoate sulphate | 100 | 1.16 | 48.89 | 82.16 | |
| (inventive) | | | | | |
| 2-ethylhexyl-6- | 40 | 1.52 | 23.29 | 95.50 | |
| aminohexanoate sulphate | 60 | 1.39 | 32.79 | 91.80 | |
| (inventive) | 80 | 1.3 | 39.41 | 88.17 | 24 |
| Isooctyl (highly branched | 40 | 1.52 | 22.01 | 96.3 | |
| (Exxal ™ 8 type))-6- | 60 | 1.38 | 31.63 | 93.13 | |
| aminohexanoate sulphate | 80 | 1.28 | 38.71 | 89.73 | |
| (inventive) | | | | | |

*not always measured

TABLE 4

| Height of the froth after air supply stopped (%) | | | | |
|---|---|---|---|---|
| | Surfactant | | | |
| | Isodecyloxypropylamine (partly neutralized by acetic acid) (comparative) | Isodecyl-6-aminohexanoate sulphate (inventive) | | 2-ethylhexyl-6-aminohexanoate sulphate (inventive) |
| | Dosage (g/t) | | | |
| Time | 40 | 60 | 80 | 80 |
| 0 | 100 | 100 | 100 | 100 |
| 20 | 100 | 79 | 68 | 55 |
| 40 | 100 | 42 | 36 | 32 |
| 60 | 100 | 11 | 18 | 9 |
| 80 | 100 | 0 | 9 | 0 |
| 100 | 100 | | 0 | |

The results show that the polyester polyquaternary ammonium compound does not work very well. When using this polyester polyquaternary ammonium the froth height remained very low and not much siliceous material was flotated from the iron ore. Also the acid insoluble amount could not be removed to the target level of 1.3%. Isodecyl-6-aminohexanoate sulphate and 2-ethylhexyl-6-aminohexanoate sulphate are as selective as established benchmarks (Table 3) but in comparison with Isodecyloxypropylamine have much better frothing properties for silicas.

Example 2

The process of Example 1 was repeated except that no depressant was employed.

In this Example a collector compound of formula (I) was employed as a 1 wt % solution in 3 tests in which an iron ore with varying silicate content as specified in the Table 5 was used.

TABLE 5

Flotation results when varying the iron silica ore using the same primary collector

| Ore | Collector | Total dosage, g/t | SiO2 in the final concentrate, % | Recovery, % |
|---|---|---|---|---|
| Iron ore containing 9% of SiO2 | Isodecyl-6-aminohexanoate sulphate | 0 | 8.91 | 100 |
| | | 60 | 7.14 | 93.3 |
| | | 85 | 5.18 | 84.6 |
| | | 110 | 4.14 | 78.6 |
| Iron ore containing 10% of SiO2 | 2-ethylhexyl-6-aminohexanoate sulphate | 0 | 9.82 | 100 |
| | | 150 | 8.63 | 89.5 |
| | | 200 | 7.98 | 77.3 |
| | | 250 | 7.7 | 70.2 |
| Iron ore containing 16% of SiO2 | 2-ethylhexyl-6-aminohexanoate sulphate | 0 | 15.59 | 100 |
| | | 70 | 7.02 | 69.1 |
| | | 105 | 5.58 | 55.7 |
| | | 140 | 4.9 | 46.4 |

Table 5 demonstrates that the primary collector component of formula (I) when used in a process to treat silica ores continues to perform very well independent of the choice of ore type. The results also demonstrate that increasing the dosage of the primary collector component leads to better results for the silicate concentrate

Example 3

The Example 3 illustrates a flotation process employing a collector composition containing a compound of formula (I) and a solvent, respectively, a collector composition containing a compound of formula (I) blended with an addition primary collector component.

The process of the above Example 1 was repeated except that no depressant was employed, employing the collector compositions and siliceous iron ores as indicated in the below Tables 6 and 7.

The results show that the presence of a compound ii, such as a solvent or additional primary collector, improves the grade of the iron concentrate (decreased amount of acid insoluble or SiO2) keeping iron recovery at similar level.

TABLE 6 ore treatment process results using collector compositions containing the primary collector of formula (I) and a solvent (II)

| | | | Total dose, g/ton | | Acid Insoluble in the | Iron recovery, |
|---|---|---|---|---|---|---|
| Iron ore | Compound i | Compound ii | Compound i | Compound ii | concentrate, % | % |
| containing 1.85% acid insoluble | 2-ethylhexyl-6-aminohexanoate sulphate | Propylene glycol | 60 | 20 | 1.2 | 86.7 |
| | 2-ethylhexyl-6-aminohexanoate sulphate | | 80 | | 1.3 | 88.2 |

TABLE 7 ore treatment process results using collector compositions containing the primary collector of formula (I) with an additional primary collector (II)

| Iron ore | Compound i | Compound ii | Total dose, g/ton Compound i | Total dose, g/ton Compound ii | concentrate $SiO_2$, % | concentrate Iron Recovery, % |
|---|---|---|---|---|---|---|
| containing 47.6% SiO2 | 2-ethylhexyl-6-aminohexanoate sulphate | Isodecyloxypropylamine (partly neutralised with acetic acid) | 14 | 56 | 8.37 | 71.4 |
| | 2-ethylhexyl-6-aminohexanoate sulphate | | 80 | | 23.1 | 76.0 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Collector composition comprising (i) as a primary collector the compound of a formula (I)

(I)

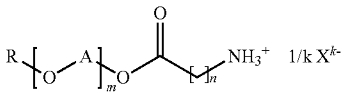

wherein R is an alkyl group comprising between about 5 and about 16 carbon atoms that may be branched or linear, k is a value of about 1 to about 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid; and (ii) a second compound chosen from other primary collectors, secondary collectors, depressants, frothers, and solvents, wherein the other primary collector is chosen from quaternary ammonium cationic surfactants different from the above formula (I) and amine-functional surfactants;

wherein the secondary collector is chosen from nonionic and anionic surfactants, wherein the nonionic surfactants are chosen from unbranched and branched fatty alcohols, alkoxylated fatty alcohols, alkylamide ethoxylates, and alkyl diethanol amide ethoxylates, wherein the anionic surfactants are chosen from fatty acids, sulphonated fatty acid, acylamidocarboxylates, acylestercarboxylates, alkylphosphates, alkylpyrophosphates, alkylsulphates, and alkylsulphonates;

wherein the depressant is chosen from polysaccharides and derivatives thereof, and polyacrylamide polymers;

wherein the frother is chosen from MIBC and propoxylated and ethoxylated C6-C10 alcohols, and wherein the solvent is chosen from C1-C5 alcohols optionally ethoxylated and/or propoxylated, provided that the second compound is not a compound of the formula ROH or R—(O-A) m-OH wherein R and m are the same as in the compound of formula (I).

2. Collector composition of claim 1 wherein R is an alkyl group that comprises about 8 to about 13 carbon atoms.

3. Collector composition of claim 2 wherein R is branched on the beta carbon atom from the oxygen atom.

4. Collector composition of claim 3 wherein n is 4, 5 or 6.

5. Collector composition of claim 4 wherein X is a halogenide, a sulphate, or a phosphate.

6. Collector composition of claim 5 wherein the secondary collector is chosen from unbranched and branched fatty alcohols, alkoxylated fatty alcohols, alkylamide ethoxylates, and alkyl diethanol amide ethoxylates.

7. Collector composition of claim 5 wherein the secondary collector is chosen from C11-C24 fatty alcohols and alkoxylated C11-C24 fatty alcohols.

8. Collector composition of claim 1 wherein R is branched on the beta carbon atom from the oxygen atom.

9. Collector composition of claim 1 wherein n is 4, 5 or 6.

10. Collector composition of claim 1 wherein X is a halogenide, a sulphate, or a phosphate.

11. Collector composition of claim 1 wherein the secondary collector is chosen from unbranched and branched fatty alcohols, alkoxylated fatty alcohols, alkylamide ethoxylates, and alkyl diethanol amide ethoxylates.

12. Collector composition of claim 1 wherein the other primary collector is chosen from alkylamines, alkylamidoamines and etheramines;

the secondary collector is chosen from nonionic and anionic surfactants, the nonionic surfactants are chosen from unbranched and branched fatty alcohols, alkoxylated fatty alcohols, alkylamide ethoxylates, and alkyl diethanol amide ethoxylates, the anionic surfactants are chosen from fatty acids, sulphonated fatty acid, acylamidocarboxylates, acylestercarboxylates, alkylphosphates, alkylpyrophosphates, alkylsulphates, and alkylsulphonates;

the depressant is chosen from polysaccharides and derivatives thereof, and polyacrylamide polymers;

the frother is chosen from MIBC and propoxylated and ethoxylated C6-C10 alcohols, and;

the solvent is chosen from propylene glycol, triethylene glycol, ethylene glycol, 2-methoxyethanol, glycerol, or isopropanol, and acetic acid, provided that the second compound is not a compound of the formula ROH or R—(O-A)m-OH wherein R and m are the same as in the compound of formula (I).

13. Pulp comprising a crushed or ground siliceous ore and a collector composition that comprises a primary collector compound of the formula (I)

(I)

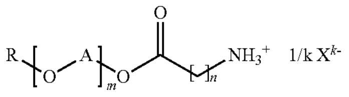

wherein R is an alkyl group comprising between about 5 and about 16 carbon atoms that may be branched or linear, k is a value of about 1 to about 3, m is an integer from about 0 to about 25, each A independently is —CH2-CH2- or -CH2CH(CH3)- or —CH2-CH(CH2-CH3)-, n is an integer of at least about 3 and at most about 8, and wherein X is an anion derivable from deprotonating a Brønsted-Lowry acid.

14. Process to treat siliceous ores wherein the process comprises a step of froth floating in the presence of a collector composition that comprises a primary collector compound of the formula (I)

(I)

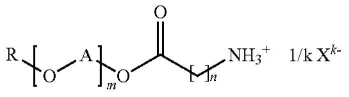

wherein R is an alkyl group comprising between about 5 and about 16 carbon atoms that may be branched or linear, k is a value of about 1 to about 3, m is an integer from about 0 to about 25, each A independently is —CH2-CH2- or —CH2CH(CH3)- or —CH2-CH(CH2-CH3)-, n is an integer of at least about 3 and at most about 8, and wherein X is an anion derivable from deprotonating a Brønsted-Lowry acid.

15. Process of claim 14 wherein the collector composition in addition comprises a component (ii) chosen from additional primary collectors, secondary collectors, depressants, frothers and solvents.

16. Process of claim 14 wherein the siliceous ore is an iron ore, hematite ore, magnetite ore, phosphate ore, calcite ore, or potash ore.

17. Process of claim 14 that is a direct flotation of silicas.

18. Process of claim 14 wherein the process comprises the steps of mixing a ground siliceous ore with an aqueous medium to form a water-ore mixture;

optionally concentrating the medium with magnetic separation;

optionally, conditioning the mixture with a depressant;

optionally, adjusting the pH;

conditioning the water-ore mixture with the primary collector compound of the formula (I);

introducing air into the conditioned water-ore mixture; and skimming off the froth formed.

19. Collector composition comprising:

(i) as a primary collector the compound of a formula (I)

(I)

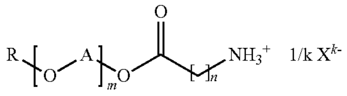

wherein R is an alkyl group comprising between about 8 and about 13 carbon atoms and that may be branched or linear, k is a value of about 1, m is about 0, n is about 5, and wherein X is an anion derivable from deprotonating a Brønsted-Lowry acid; and (ii) a second compound comprising a combination of propylene glycol and water.

20. Collector composition of claim 19 wherein R is an alkyl group comprising between about 8 and about 10 carbon atoms.

* * * * *